US012215860B2

(12) United States Patent
Grillotti et al.

(10) Patent No.: US 12,215,860 B2
(45) Date of Patent: Feb. 4, 2025

(54) FLAME DETECTION AND IGNITION DEVICE

(71) Applicant: John Zink Company, LLC, Tulsa, OK (US)

(72) Inventors: Dominique Grillotti, Guénange (FR); Gilles Theis, Dudelange (LU); Clement Bresillion, Metz (FR)

(73) Assignee: JOHN ZINK COMPANY, LLC, Tulsa, OK (US)

( * ) Notice: Subject to any disclaimer, the term of this patent is extended or adjusted under 35 U.S.C. 154(b) by 502 days.

(21) Appl. No.: 17/439,423

(22) PCT Filed: Mar. 26, 2020

(86) PCT No.: PCT/IB2020/052877
§ 371 (c)(1),
(2) Date: Sep. 15, 2021

(87) PCT Pub. No.: WO2020/194238
PCT Pub. Date: Oct. 1, 2020

(65) Prior Publication Data

US 2022/0154929 A1 May 19, 2022

(30) Foreign Application Priority Data

Mar. 26, 2019 (GB) ..................................... 1904194

(51) Int. Cl.
*F23D 14/72* (2006.01)
*F23Q 3/00* (2006.01)
(Continued)

(52) U.S. Cl.
CPC ........... *F23D 14/725* (2013.01); *F23Q 3/004* (2013.01); *H01T 13/20* (2013.01); *H01T 21/02* (2013.01)

(58) Field of Classification Search
CPC ..... F23D 14/725; F23Q 3/004; H01T 13/467; H01T 13/20; H01T 13/32; H01T 13/39; H01T 21/02
See application file for complete search history.

(56) References Cited

U.S. PATENT DOCUMENTS 3,282,324 A 11/1966 Pat
3,614,280 A 10/1971 Yamaguchi
(Continued)

FOREIGN PATENT DOCUMENTS

CN 201462910 U 5/2010
CN 103857962 A 6/2014
(Continued)

OTHER PUBLICATIONS https://sites.ecse.rpi.edu/~schubert/Educational-resources/Materials-Hardness.pdf.*
(Continued)

*Primary Examiner* — Ko-Wei Lin

(57) ABSTRACT

There is disclosed an ionisation and/or ignition device comprising: an inner rod, an outer sleeve, and an electrical insulator. The inner rod comprises a semiconductor refractory material. The outer sleeve comprises a semiconductor refractory material. The electrical insulator is disposed between the inner rod and the outer sleeve. The inner rod material has a greater hardness than the outer sleeve material.

21 Claims, 7 Drawing Sheets

(51) Int. Cl.
*H01T 13/20* (2006.01)
*H01T 21/02* (2006.01)

(56) References Cited

U.S. PATENT DOCUMENTS

| | | | |
|---|---|---|---|
| 4,245,977 A | 1/1981 | Morese | |
| 4,525,138 A | 6/1985 | Snyder et al. | |
| 6,927,362 B2 | 8/2005 | Haluschka | |
| 10,101,028 B2 | 10/2018 | Loveless et al. | |
| D851,505 S | 6/2019 | Grillotti et al. | |
| 2008/0145672 A1* | 6/2008 | Willkens | B28B 1/24 264/328.8 |
| 2019/0115729 A1* | 4/2019 | Takeichi | H01T 13/34 |

FOREIGN PATENT DOCUMENTS

| | | | |
|---|---|---|---|
| CN | 104822991 | A | 8/2015 |
| DE | 202004006644 | U1 | 8/2004 |
| EP | 0995949 | A3 | 11/2000 |
| GB | 206215 | A | 10/1923 |
| GB | 559740 | A | 3/1944 |
| GB | 879482 | A | 10/1961 |
| WO | 2006050201 | A2 | 5/2006 |
| WO | 2008021508 | A2 | 2/2008 |

OTHER PUBLICATIONS

International Preliminary Report and Patentability received for PCT Application No. PCT/IB2020/052877, mailed on Sep. 28, 2021, 9 pages.

International Search Report and Written Opinion received for PCT Application No. PCT/IB2020/052877, mailed on Jul. 13, 2020, 12 pages.

John Link Hamworthy, "LPMW Radiant Wall Burner", 2016, pp. 1-2.

Platvoet et al., "Process Burners 101", American Institute of Chemical Engineers, Aug. 2013, pp. 35-39.

* cited by examiner (a)

(b)

(a)

(b)

(c)

(a)

(b)

FLAME DETECTION AND IGNITION DEVICE

CROSS-REFERENCE TO RELATED APPLICATIONS

This application is a national phase of PCT/IB2020/052877, filed on Mar. 26, 2020, which claims priority based on GB Patent Application No. 1904194.6, filed Mar. 26, 2019. The priorities of the foregoing applications are hereby claimed, and the disclosures incorporated herein by reference in their entireties.

TECHNICAL FIELD

The present invention relates to a device configured to be used for either or both of flame detection and/or flame ignition in an industrial burner. In particular, the invention relates to a flame detection and/or ignition device having an improved construction, which combines manufacturability with an ability to withstand high temperature applications.

BACKGROUND

It is known to use an electrode as a detector for ionisation that can occur at high temperatures, for example a high temperature within a flame or site of combustion.

UK patent number 879,482, filed on 13 Aug. 1959, describes a flame detector which has an electrode comprising a refractory semiconductor material, for monitoring the presence of a flame in a furnace. The electrode comprises an active portion consisting of a rod of silicon carbide, which can be arranged in a hole in the furnace wall and project into the furnace. The detector further comprises an electric circuit configured such that when a grounded flame is present in the vicinity of the silicon carbide electrode, a current will flow from a negative terminal to ground, and this current can be detected to determine the presence of a flame.

It is known to use incorporate the functionality of a flame detector, in a device which also functions as a flame ignition device. U.S. Pat. No. 4,245,977, filed on 25 Apr. 1977, describes a method and apparatus for hydrocarbon flame ignition and detection. This document teaches using a pair of flame-detecting electrodes positioned at the site of a flame, spaced apart to accommodate the flame's reaction zone. One of the electrodes can serve as an ignition element and is, according to this document, sufficiently electrically resistive so as to undergo self-heating in response to current flow therethrough. In an aspect of the invention described in this document, an AC line voltage is applied across the resistive electrode in the ignition phase, to cause sufficient heating to light a flame. An AC line voltage is applied across the electrode gap during the detection phase. In a further aspect of the invention in this document, there is thermal heating of both electrodes by a flame to reduce ignition time and what is referred to as a "wall quenching" effect.

German utility model number DE 20 2004 006 644 U1 describes an ionisation device for flame monitoring, and an ignition device, for use in a gas or oil burner. The device in this document comprises an electrically conductive ceramic body. The ignition device has two electrodes which are formed as rods and arranged side by side with a spark formed between them.

It is also known to use a pilot light to light a burner and a scanner device to detect a flame. Examples of flame detection systems include thermocouple flame detection, flame ionisation as described above, and optical scanning for the presence of a flame. However, known optical scanners in common usage are complex and expensive devices.

There exists a need for improvements in ionisation and ignition devices.

STATEMENTS OF INVENTION

According to a first aspect of the invention, there is provided a device configured for use in as an ionisation detection device and/or as an ignition device, the device comprising:

- an inner rod comprising a first semiconductor refractory material, having a first hardness;
- an outer sleeve comprising a second semiconductor refractory material, having a second hardness;
- an electrical insulator, the electrical insulator being disposed between the inner rod and the outer sleeve;
- wherein the first hardness is greater than the second hardness.

A person skilled in the art will understand that the term "refractory" describes a material which can retain its properties at high temperatures, such as those at a combustion site. Refractory materials have the capacity to withstand high temperatures without melting or decomposing, while remaining unreactive and inert. Specifically, refractory materials can maintain structural integrity and do not change phase above temperatures such as 500° C. (for example various grades of stainless steel). More specifically certain refractory materials can maintain structural integrity and do not change phase above 1400° C. (for example silicon carbide), which can be beneficial in certain implementations of the present invention.

This arrangement has the advantage of providing a device in which the inner rod can be made to a shape and size suitable for high temperature applications, while the outer sleeve which has a lower hardness than the inner rod, can be manipulated into a suitable shape or size for attachment to an anchoring site or other means. This arrangement has the advantage of combining ease of manufacture, while benefiting from reliable performance.

Devices according to the invention can be used for one or both of two purposes. In some applications, the device is used as a flame ionisation detection device. In other applications, the device can be used as a flame ignition device. In still further applications, the device can be used as both a flame detection and ignition device. As will become evident from a reading of the following specification, certain properties can be adapted to enable the device to perform in an improved manner in either one, or both, of those functions. Such a device can therefore be referred to as an ionisation device or ionisation detection device, or as an ignition device, or both according to its configuration and use.

The inner rod material may comprise a non-oxide ceramic. The inner rod may comprise silicon carbide. The inner rod may comprise re-crystallised silicon carbide. The inner rod material may have a Young's Modulus of approximately more than 200 GPa, preferably more than 250 GPa, more preferably 280 GPa as tested using ASTM E111-17 ("Standard Test for Young's Modulus"). The inner rod material may have a mechanical resistance (3 points of flexion) at 20° C. of around 80 to 100 MPa. The inner rod material may have a mechanical resistance (3 points of flexion) at 1000° C. of around 90 to 110 MPa. The inner rod material may have a density of approximately 2.7 g/cm$^3$. The inner rod material may have a water absorption of approximately 5%. The inner rod material may have a thermal conductivity at 200° C. of 35 W $m^{-1}$ $K^{-1}$. The inner rod material may have a thermal expansion coefficient between 20 C and 1000 C of $4.5\times10^{-6}$ $K^{-1}$. The inner rod material may have a Vickers hardness of 2400 to 2800 kgf $mm^{-2}$ as tested using ASTM C1327-15.

The inner rod may be substantially cylindrical. This has the advantage of providing a device in which the inner rod, which may be exposed to high temperatures, for example those present in a flame, is mechanically resilient, without compromising on ease of manufacture. The inner rod may be substantially elongate. The inner rod may have an aspect ratio of over 1:10. The aspect ratio may be greater than 1:10 (i.e. 1:10+), with the cylindrical diameter being shorter than the cylinder length.

The outer sleeve may comprise a non-oxide ceramic. The outer sleeve may comprise silicon carbide. The outer sleeve may comprise sintered silicon carbide. The outer sleeve may have a microstructure indicative of having been sintered. The outer sleeve may comprise silicon-infiltrated silicon carbide. The outer sleeve may comprise a metal or alloy having refractory properties, preferably refractory stainless steel, specifically stainless steel comprising a suitable amount of a refractory metal, such as one or more of: molybdenum; niobium; tantalum; tungsten and rhenium. The stainless steel may be coated with a ceramic material. The outer sleeve may comprise a microstructure indicative of a component in which the component has been machined before sintering. The outer sleeve material may have a Poisson's ratio of 0.16. The outer sleeve material may have a hardness of 9.5 Mohs. The outer sleeve material may have a Vickers hardness of 22, when tested with a weight of 500 Kg. The outer sleeve material may have a shear modulus of 180 GPa. The outer sleeve material may have a Young's modulus of 420 GPa. The outer sleeve material may have a mechanical resistance (3 points flexion) at 1400° C. of 450 MPa. The outer sleeve material may have a mechanical resistance (3 points flexion) at 1000° C. of 450 MPa. The outer sleeve material may have a mechanical resistance (3 points flexion) at 20° C. of 450 MPa. The outer sleeve material may have a tenacity of 3.5 MPa $m^{0.5}$. The outer sleeve material may have a maximum use temperature in air of 1450° C. The outer sleeve material may have a maximum use temperature in a neutral atmosphere of 1800° C. The outer sleeve material may have a total porosity of less than 305%, volume to volume. The outer sleeve material may have an average crystal size of $5\times10^{-6}$ m. The outer sleeve material may have an electrical resistivity at 20° C. of $10^5$ Ohm metres. The outer sleeve material may have a specific heat at 1000° C. of 1180 J/Kg.° K. The outer sleeve material may have a specific heat at 500° C. of 1040 J/Kg.° K. The outer sleeve material may have a specific heat at 20° C. of 680 J/Kg.° K. The outer sleeve material may have a linear expansion coefficient between 20 and 1000° C. of $4.6\times10^{-6}$/° C. The outer sleeve material may have a linear expansion coefficient between 20 and 1400° C. of $5.2\times10^{-6}$/° C. The outer sleeve material may have a linear expansion coefficient between 20 and 500° C. of $4\times10^{-6}$/° C. The outer sleeve material may have a thermal conductivity at 1000° C. of 40 W/m.° K. The outer sleeve material may have a thermal conductivity at 20° C. of 180 W/m.° K. The outer sleeve material may have a thermal conductivity at 500° C. of 68 W/m.° K.

The outer sleeve may be substantially tubular. The outer sleeve may comprise a tip end; a root end distal from the tip end, and a connector portion disposed adjacent to the root end for connection to a connecting sleeve. The connector portion may include a clamp, threaded portion or bayonet type fixing. The outer sleeve may comprise a body portion, and a greatest lateral dimension of the threaded portion may be smaller than a greatest external lateral dimension of the body portion. This has the advantage of providing a device which is easy to assemble. The body portion, being larger than the threaded portion, may provide an end point which may act as a guide during assembly, from which it is clear when the device has been threaded correctly.

The tip end of the outer sleeve may comprise one or more projecting tip(s). The projecting tip(s) may be configured to extend towards the inner rod of the ionisation and/or ignition device to define an air gap between the projecting tip(s) and the inner rod for flame ionisation and/or flame ignition. The projecting tip may have a tapered end tapering toward the air gap. This may have the advantage of providing a localised spark gap when the device is used as an ignition device.

The ionisation and/or ignition device may further comprise a connecting sleeve connected to the root end of the outer sleeve, the connecting sleeve comprising an electrically conductive material. The connecting sleeve may comprise a material having a lower hardness and/or a lower temperature resistance than the outer sleeve. This may provide a device with improved performance, ease of manufacture, and efficient use of materials.

The inner rod may have a root end, and the ionisation and/or ignition device may further comprise a connecting rod, connected to the root end of the inner rod, the connecting rod comprising an electrically conductive material. The connecting rod may comprise a material having a lower hardness and/or a lower temperature resistance than the inner rod. The electrically conductive material of the connecting sleeve or the connecting rod may comprise metal. The metal may comprise stainless steel, preferably refractory stainless steel. Similar to the provision of a connecting sleeve, provision of a connecting rod having any of the features described above may also provide a device with improved performance, ease of manufacture, and efficient use of materials.

The ionisation and/or ignition device may comprise connection means such as a clamping mechanism, the clamping mechanism or other connection means being configured to fixedly attach the connecting rod and the inner rod via an outer surface of the rod, such as via a clamping force. This may provide a reliable and stable connection between the connecting rod and inner rod. Alternatives may include a sufficiently heat resistant glue or chemical bond. Preferred connection means require no machining or forming of the rod to facilitate the connection.

The connecting sleeve may comprise a threaded portion which is configured for attachment to the threaded portion of the outer sleeve. This may have the advantage of easy assembly, and provision of a reliable connection.

The electrical insulator may be disposed between and may be in contact with: an inner surface of the outer sleeve and an outer surface of the inner rod; and wherein the electrical insulator is disposed between and is in contact with: an inner surface of the connecting sleeve, and an outer surface of the clamping mechanism. This has the advantage of providing a device in which the components are structurally supported by each other.

The ignition and/or ionisation device may have a lateral dimension of less than 4 cm. The ignition and/or ionisation device may be configured such that it can be at least partially inserted into a 4 cm wide aperture. Specifically, the outer sleeve may be configured such that it can be at least partially inserted into a 4 cm wide aperture. This has the advantage of providing a device which is suitable for a wide range of applications, which can be easily integrated into a combustion site.

According to a further aspect of the invention, there is provided a method of making an ionisation and/or ignition device comprising the steps of: providing an outer sleeve comprising a semiconductor refractory material; providing an inner rod comprising a semiconductor refractory material which is harder than the inner rod material; providing an electrical insulator; inserting the inner rod into the electrical insulator; inserting the electrical insulator and the inner rod into the outer sleeve.

This method has the advantage of simple and efficient assembly of an ionisation and/or ignition device. As will be appreciated in light of this disclosure, any of the features of the product described above can be provided during steps in the related method.

BRIEF DESCRIPTION OF THE DRAWINGS

Embodiments of the present invention will now be described, by non-limiting example only, with reference to the accompanying drawings, in which.

DETAILED DESCRIPTION OF EMBODIMENTS OF THE INVENTION

Figure 1:
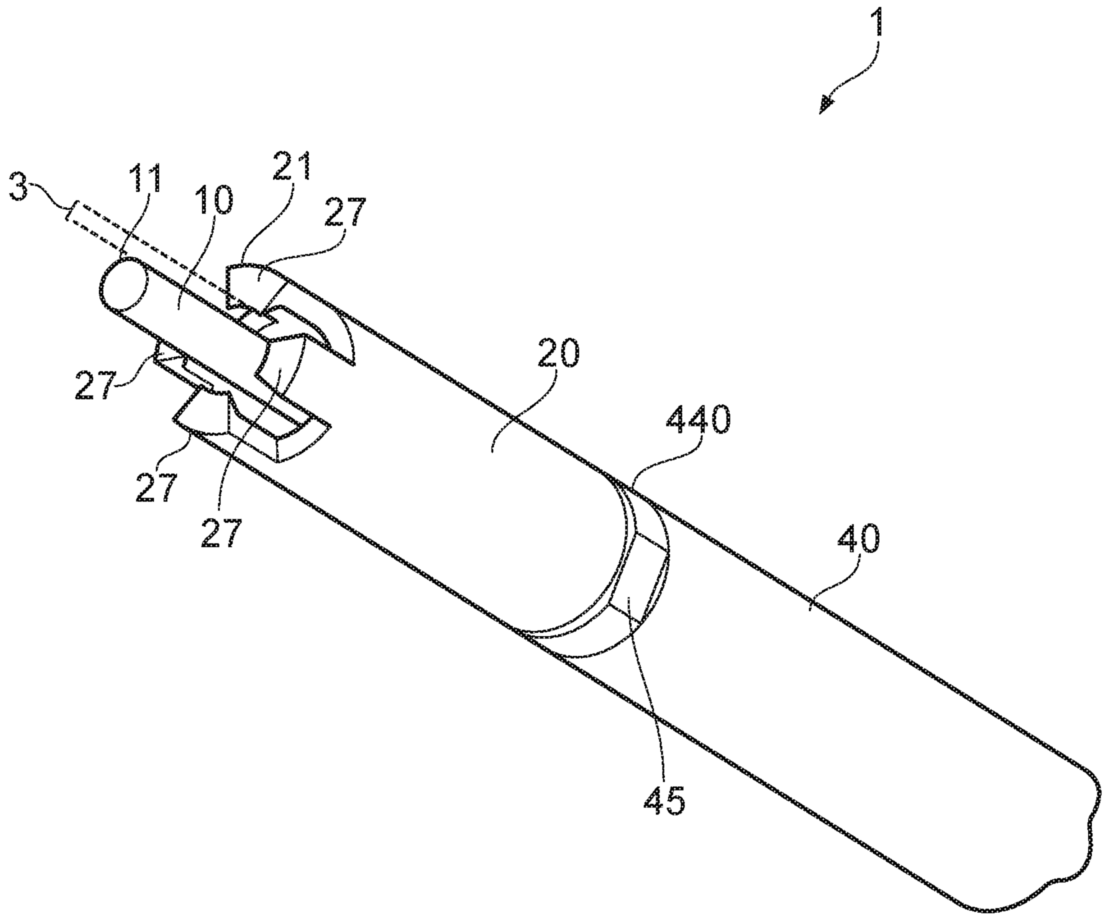
FIG. 1 is a perspective view of an ionisation and/or ignition device incorporating features of the present invention.

FIG. 1 shows an embodiment of a flame ionisation detection and/or ignition device 1 incorporating features of the present invention.

As described above, devices according to embodiments of the invention can be used for one or both of two purposes. In some applications, the device is used as a flame ionisation detection device. In other applications, the device can be used as a flame ignition device. In still further applications, the device can be used as both a flame detection and ignition device. As will become evident from a reading of the following specification, certain properties can be adapted to enable the device to perform in an improved manner in either one, or both, of those functions. A skilled reader will be aware of how electrical control systems can be applied to the device described herein to utilise the illustrated devices as either flame ionisation detection and/or ignition devices and so such control systems are not described in detail. The novel features of the embodiments described herein lie in the physical construction and materials of the device as described in the following passages.

Advantageously, the ionisation detection and/or ignition according to embodiments of the present invention is configured such that at least a part of the device can withstand high temperatures whilst substantially maintaining its structural or mechanical integrity. High temperatures in this context are those experienced in an industrial furnace or boiler and, as a skilled reader will appreciate, such temperatures can include those over 800° C., preferably over 1000° C., more preferably over 1400° C. Such exposure may be continuous exposure for a prolonged period of time, for example during detection when in the ionisation detection mode. Alternatively, the device may be subject to short but repeated exposure, which might occur, for example, when the device is used as an ignition device, which may not be mounted as directly in the flame as a flame detection device. In either case, the device may be subject to prolonged or fluctuating extremes of temperature, which can cause thermal deformation of the materials of the product. These effects can hinder the device's proper function and shorten the product's life.

Existing ionisation detection and/or ignition devices utilise known heat-resistant materials to provide a detector or ignition device which can withstand high temperatures. However, the complexity and durability of such devices is not suited to all applications and these factors have been improved upon by the inventors of the present application.

The flame ionisation detection and/or ignition device 1 of FIG. 1 comprises a rod 10, which has a first end 11. The first end 11 of the rod may be exposed to high temperatures in use. In particular, the device can be arranged so as to extend into a combustion site, through a wall (not shown) of a combustion chamber of a burner, furnace or boiler. The first end 11 of the rod 10 can be arranged to be oriented into the chamber, thus being arranged to extend inwardly away from the chamber wall. Such arrangements can be advantageous when a device is being retro-fitted to existing burners, since existing burners may have suitable holes already in place. Further, where suitable holes are not present, a circular hole through which the device can extend can be easily formed by a drilling operation. The generally elongate tubular form of the device, which is illustrated in the drawings, is therefore advantageous.

As seen in FIG. 1 an outer sleeve 20 can also be provided. The outer sleeve 20 is provided so that it extends alongside the rod 10, and can be installed so that the sleeve 20 also extends into a combustion site. The sleeve 20 may be electrically insulated from the rod 10 and, at the first end of the device 1, which is exposed to high temperatures in use, a gap 3 may be provided between the sleeve 20 and the rod 10, as shown in FIG. 1. The rod 10 and outer sleeve 20 are designed so that, in use, they are electrically conductive, so that electrons may pass through each of the rod 10 and outer sleeve 20, towards and/or away from the gap 3 defined between the rod 10 and outer sleeve 20. The size of the gap 3 between the rod 10 and the outer sleeve 20 is important to the correct functioning of the device and so the arrangement of the device has been developed to preserve the correct gap 3 even in the extreme temperature conditions experienced by the device 1 in use.

The inventors have determined that an elongate rod 10 has improved performance and improved applicability to arrange of burner arrangements relative to known configurations of devices which perform similar functions. However, an elongate configuration as illustrated presents various challenges, due to the relatively long and thin elongate configuration of the rod 10 and its exposure to high temperatures. Repeated or sustained exposure to high temperatures can result in deformation of components, which devices described herein seek to avoid or reduce.

Figure 2:
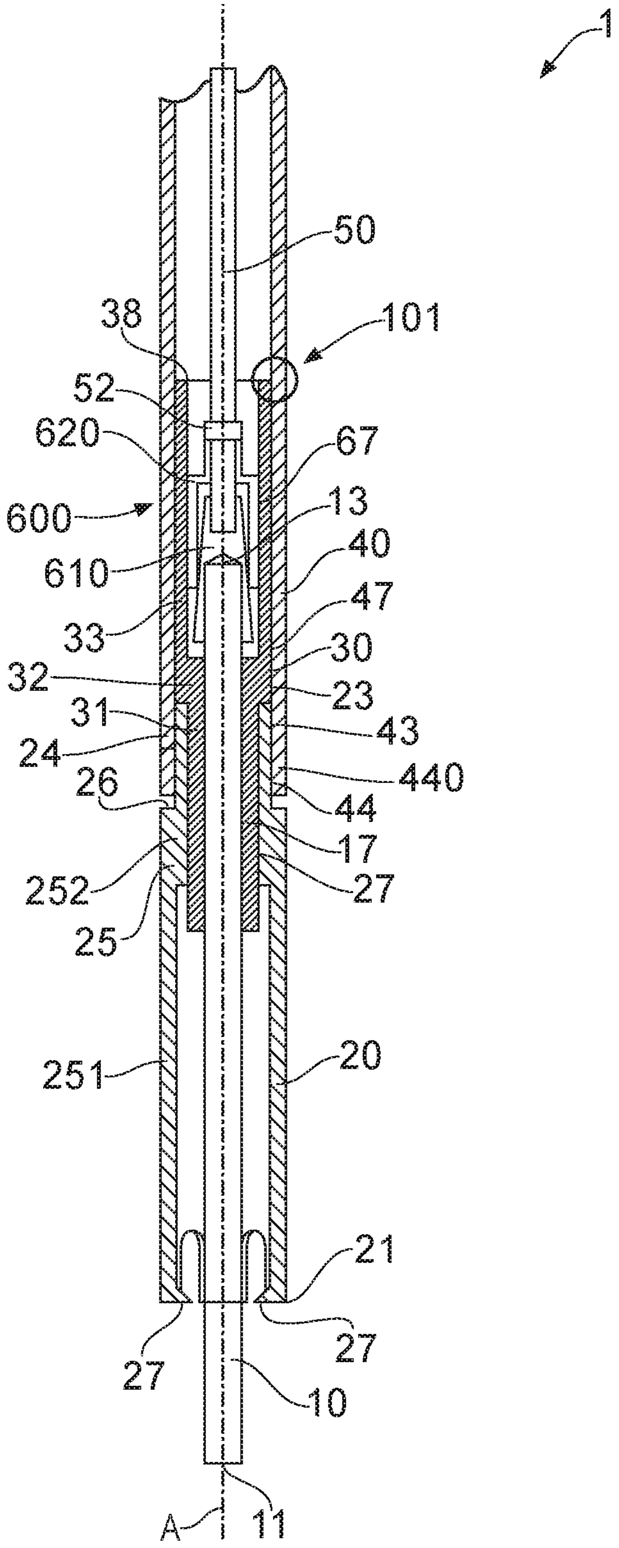
FIG. 2 is a cross-sectional view through the device of FIG. 1.

In order to address these issues, devices as described herein have an inner rod 10, an outer sleeve 20, and an electrical insulator 30 (best seen in FIG. 2). The inner rod 10 and the outer sleeve 20 each comprise a semiconductor refractory material. The electrical insulator is disposed between the inner rod 10 and the outer sleeve 20. The inner rod 10 is harder than the outer sleeve 20. Specifically, the inner rod 10 comprises a material which has a greater hardness than the material of the outer sleeve 20. Although the inner rod 10 may comprise other materials and components, the inner rod 10 may equally consist only of material which has a greater hardness than the outer sleeve material. Specifically, the inner rod 10 may consist of only one material, for example a single unitary piece of material, which has a greater hardness than the outer sleeve material. Due to its narrow dimensions, a greater hardness is the most beneficial in the inner rod 10. However, harder materials bring greater difficulties in manufacture. The inventors have discovered that a material having a lower hardness than the rod 10 can be used for the outer sleeve 20. This can facilitate easier manufacture of the outer sleeve 20, while providing the greatest heat resistance to the inner rod 10. As will be appreciated from a reading of the following passages, the device described allows for minimal manufacturing processes, such a material removal processes, being carried out on the component of the rod 10, having the greatest hardness and heat resistance. An example of a suitable material for the rod 10, given the configuration of the present invention, is a non-oxide ceramic, such as silicon carbide, and more specifically re-crystallised silicon carbide.

The arrangements described provide a device 1 which is more resistant to prolonged or repeated exposure to high temperatures than prior art devices. This can allow for provision of a rod 10 which extends further toward or into a flame than other components of the device 1, which can result in improved performance of the device. The described arrangements also allow for a configuration of rod 10 which is relatively thin and elongate, while still having the required mechanical properties and durability, providing improved performance and adaptability of the device to a range of applications.

Having an outer sleeve 20 which has a lower hardness than the rod 10, also allows for the outer sleeve 20 to be more easily manufactured with the required features for assembly of the device. For example, the outer sleeve 20, which has a lower hardness than the rod 10, will be more easily to formed or machined to have the required features to enable its functionality, than the rod 10. The sleeve 20 may therefore be provided with features that are not practically suitable for the rod 10, such as a threaded engagement feature, or features toward its first end which provide the requisite gap between the rod 10 and features of the sleeve 20. This has the further advantage of allowing for a rod 10 of any suitable configuration to be provided, since any connecting or complex features may be provided on the more readily manufactured outer sleeve 20.

The insulator 30, and/or the outer sleeve 20 can be configured to have a configuration which supports the rod 10, and may be configured for attachment to the rod 10 and/or any surrounding component.

An example of suitable semiconductor refractory material for the outer sleeve 20 includes but is not limited to a non-oxide ceramic, such as silicon carbide. The silicon carbide of the outer sleeve 20 may be sintered, and may have a microstructure indicative of having been sintered. The silicon carbide of the outer sleeve 20 may be silicon-infiltrated silicon carbide. Alternatively or additionally, the outer sleeve 20 may comprise a stainless steel refractory material, although other metallic refractory materials may be suitable. The outer sleeve 20 may have a visual appearance of, and/or an internal or external microstructure indicative of, a component which has been machined before sintering.

Providing an outer sleeve 20 with a lower hardness than the inner rod 10 has the advantage of being easier to manipulate into the required shape during manufacture. An example of a feature which is possible for the outer sleeve 20 is a threaded connection, which may not be practical for the inner rod 10 due to its hardness being higher than the outer sleeve 20. For example, the outer sleeve 20 may comprise a connecting means configured to attach the outer sleeve 20 to a connecting sleeve 40. The connecting means may be a threaded connection, which may comprise a threaded portion 24 on the outer sleeve 20. The threaded portion 24 on the outer sleeve 20 may be disposed adjacent to a root end 23 of the outer sleeve 20 for connection to a connecting sleeve 40. Alternative arrangements which may be used in place of the threaded connection include a bayonet-type connection or a clamping connection.

A further example of a feature which is possible for the outer sleeve 20 due to its relative hardness, is one or more projecting tip(s) 27. There may be provided one, two, three or more projecting tips. Fewer projecting tips 27 may have the advantage of providing a device 1 which is simpler to manufacture. More projecting tips may have the advantage of providing a device 1 having improved performance. The projecting tip(s) may be arranged such that a predefined gap 3 is provided between the tip(s) and the inner rod 10. The device 1 may be configured such that in the ignition mode, the gap 3 or gaps 3 act as a spark gap, i.e. a gap across which a potential difference can be applied exceeding a breakdown voltage, providing a spark across the gap. The projecting tip(s) 27 may be configured to extend towards the inner rod 10 of the ionisation and/or ignition device 1 to define an air gap between the projecting tip(s) 27 and the inner rod 10 for ionisation and/or flame ignition.

Figure 3:
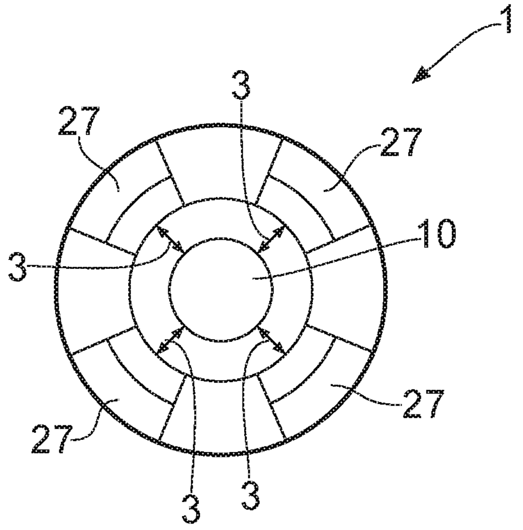
FIG. 3*a* is a front view of the device of FIG. 1.
FIG. 3*b* is a view of detail 101 of the device of FIG. 1.
Figure 3:
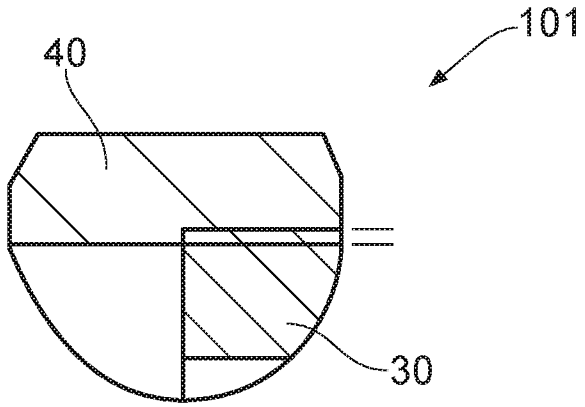
Figure 4:
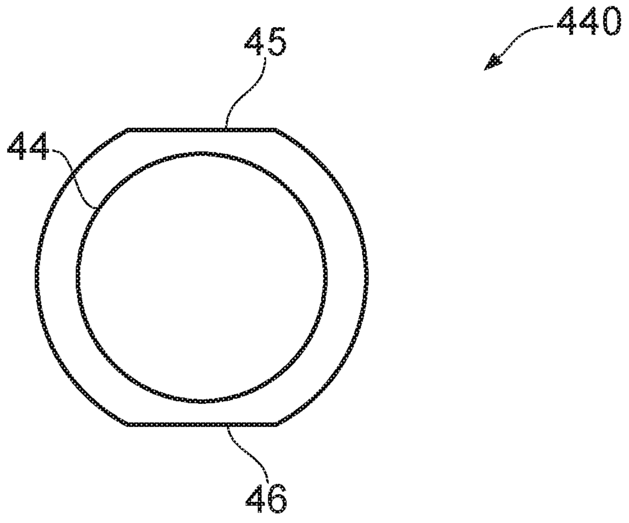
FIG. 4 is a front view of a threaded portion of the device of FIG. 1.

In the embodiment shown in FIG. 1, there are provided four projecting tips 27, which provide four gaps 3 between each projecting tip 27 and the rod 10. A front view of the projecting tips can be seen in FIG. 3*a*, in which it can be seen that the projecting tip(s) 27 may be substantially the same size and/or shape as each other, a configuration which may apply to any embodiment having more than one projecting tip. The projecting tip(s) may be substantially equally spaced from each other, in a circumferential direction around the sleeve, which may also apply to any embodiment having more than one projecting tip. The or each projecting tip 27 may have a tapered end, tapering toward the air gap as shown in FIG. 1, a feature which may apply to any or all embodiments. Projecting tip(s) provided with tapered end(s) provides for improved performance, due to the spark gap location being controlled. Other numbers of projecting tips 27 can be envisaged, such as 1, 2, 3, 4, 5, 6 or more. The plural tips are preferably generally equally spaced around a circumference of the first end of the sleeve 20.

Although one embodiment of the present invention is shown in FIGS. 1 and 2, it should be appreciated that various modifications and configurations of the features of this embodiment are possible. Specific advantageous features are described herein, however it should be noted that various features and modifications which are not specifically listed herein may also be possible and advantageous.

The inner rod 10 may be substantially elongate as shown in FIG. 1, and may have an aspect ratio of over 1:10. The aspect ratio may be greater than 1:10 (i.e. 1:10+), with the cylindrical diameter being shorter than the cylinder length, as shown in FIG. 1. The aspect ratio may be 1:15, more preferably 1:20. The higher the aspect ratio, the more the tip 11 of the rod 10 can extend into a combustion container in use. This has the advantage of a device 1 in which the tip 11 of the rod 10 can be separated from other components of the device 1 by a greater distance. This has the advantage of providing a greater distance between a high temperature location (i.e. at the tip 11 of the rod 10) and other components of the device. Components further from the tip 11 therefore need not be as resilient to high temperatures as the tip 11 of the rod 10. This may allow for lower mechanical or thermal resistance requirements of such components (i.e. components which are located further away from the tip 11 of the rod 10), as they may not be exposed to high temperatures. The configuration of the device can therefore lead to more efficient use of materials of appropriate specifications, without using over-specified components, which can otherwise unnecessarily increase manufacturing complexity and related costs.

Various configurations of inner rod 10 are possible, and the inner rod 10 may be any suitable shape. The rod may not be elongate, but may have an end part which extends from a body of the inner rod 10. The inner rod 10 preferably extends along a substantially straight axis as shown in FIG. 1. Specifically, the inner rod 10 may extend in a straight line or extend in a line that is substantially straight. Equally, the inner rod 10 may be provided having at least one or more portions which do not extend in a straight line. The rod may be configured such that it is plate shaped and extends in a substantially straight direction, and at least partially in a plane. The inner rod may be cylindrical, prismatic, cuboidal, plate-shaped, heptagonal, hexagonal, or may have a longitudinal cross section having any polygonal or other suitable shape. Use of a solid (i.e. not hollow) cylindrical rod is advantageous due to ease of manufacture, ease of installation into the ionisation and/or ignition device 1, and reliable mechanical and electrical performance. Use of a straight rod 10 is advantageous due to simpler manufacture.

The inner rod 10 may, as explained above, have a tip end 11, and may further have a root end 13. The inner rod 10 may have a substantially uniform cross section along its length from the root end 13 to the tip end 11, as shown in FIGS. 1 to 4. Equally, the inner rod 10 may be tapered such that it does not have a uniform cross-section. The inner rod 10 may have a flat surface at the tip end 11 and/or a flat surface at the root end 13 as partially shown in FIG. 1. An inner rod 10 which has a substantially uniform cross-section has the advantage easier manufacture, installation, and resilience to high temperatures. The inner rod 10 may have rotational symmetry, or be substantially symmetrical, about a central axis.

Various configurations of outer sleeve 20 are possible, and the outer sleeve 20 may be any suitable shape. The outer sleeve 20 may be substantially tubular, such that it has the shape of an at least partially hollow tube. This has the advantage of providing a configuration in which the inner rod 10 can be received. The tube may be hollow along its full length, defining a bore which passes through a full or partial length of the outer sleeve 20. The bore may be substantially cylindrical, or may be any appropriate shape, such as rectangular, prismatic, cuboidal, plate-shaped, heptagonal, hexagonal, or may have a polygonal or any other suitable shape. A substantially cylindrical bore has the advantage of ease of manufacture and installation. The outer sleeve 20 may have a lateral dimension less than 4 cm. The outer sleeve 20 may be configured such that it can be at least partially inserted into a 4 cm wide aperture. Other dimensions can be beneficial, though an outer diameter in the range of, for example, 2 cm to 10 cm allows implementation in a useful range of different applications.

The outer sleeve 20 may comprise a tip end 21 and a root end 23. The root end 23 may be the end which is distal from the tip end 21, i.e. the end which is further from the heat source in use. As shown in FIG. 1, the outer sleeve 20 may comprise a body portion 25, and a greatest radial or diametric dimension of the threaded portion 24 may be smaller than a greatest external radial or diametric dimension of the body portion 25. This can allow for a step 26 to be provided. The step 26 may radially connect the body portion 25 to the threaded portion 24. The step 26 may therefore extend in a radial direction. A lateral extension of the step 26 may be radial extension, in a direction away from the axis A. The step 26 may provide a guide during assembly of the device 1, by acting as an alignment means and a feature which can prevent the outer sleeve 20 from being wrongly assembled. Where a threaded portion 24 is provided on the outer sleeve 20, the step 26 may prevent over-rotation and possible incorrect assembly of the outer sleeve 20. The step 26 may also provide a stabilising means, by restricting movement of the outer sleeve 20 in use, which may provide a more reliable and structurally stable device 1.

The outer sleeve 20 may be configured to receive the electrical insulator 30. The outer sleeve 20 may be configured to receive the electrical insulator 30 such that the electrical insulator 30 is aligned with the outer sleeve 20. The electrical insulator 30 may have an outer dimension substantially equal to an inner dimension of the outer sleeve 20. The outer sleeve 20 may be configured such that the electrical insulator 30 can be at least partially disposed in the outer sleeve 20, with the electrical insulator 30 being in contact with the outer sleeve 20. This has the advantage of providing a structurally stable device 1, in which movement of the outer sleeve 20 and the electrical insulator 30 relative to each other may be restricted.

The body portion 25 of the outer sleeve 20 may have a first wall portion 251 and a second wall portion 252. As shown in FIG. 2, the first wall portion 251 may define a bore, and the second wall portion 252 together with the threaded portion 24 may also define a bore. The threaded portion 24 may also define a bore. The first and second wall portions 251, 252, may each have an outer dimension. The outer dimension of the first wall portion 251 may be equal to the outer dimension of the second wall portion 252. An outer dimension of the threaded portion may be smaller than the outer dimension of the first and/or second wall portions 251, 252. The first and second wall portions 251, 252, and the threaded portion 24 may each have an inner dimension. The inner dimension of the first wall portion 251 may be larger than the inner dimension of the second wall portion 252. The inner dimension of the threaded portion 24 may be substantially the same as the inner dimension of the second wall portion 252. The bore defined by the first wall portion 251 may be wider and/or longer than the bore defined by the second wall portion 252. Each bore may be configured to at least partially receive an electrical insulator 30. The second bore may be configured to at least partially receive the electrical insulator 30 such that the electrical insulator 30 is aligned with the bore of the second wall portion 252.

The electrical insulator 30 is disposed between the inner rod 10 and the outer sleeve 20. The electrical insulator 30 may comprise a material which is known to have a low conductivity in use. The electrical insulator 30 may comprise a material which is known to be used as an electrical insulator. The electrical insulator may, for example, comprise a non-conductive ceramic. The electrical insulator may have a conductivity of less than $10^{-8}$ Siemens/cm. The electrical insulator 30 may be a single unitary piece of material.

The electrical insulator 30 may be partially disposed between the inner rod 10 and the outer sleeve 20. The electrical insulator 30 may be configured to at least partially receive the inner rod 10, and/or at least partially be received in the outer sleeve 20.

The electrical insulator 30 may have a first part 31, a connecting part 32 and a second part 33. The first part 31 may be connected to the second part 33 by means of the connecting part 32. The first part 31 may be configured to receive the inner rod 10. The electrical insulator 30 may be configured to receive the inner rod 10 such that the inner rod 10 is aligned with the electrical insulator 30. The first part 31 may have an inner dimension substantially equal to an outer dimension of the inner rod 10. The electrical insulator 30 may be configured such that the inner rod 10 can be at least partially disposed in the first part 31, with the electrical insulator 30 being in contact with the inner rod 10. This has the advantage of providing a stable device 1, in which movement of the inner rod 10 and the electrical insulator 30 relative to each other may be restricted. The second part 32 may be configured to receive a connecting rod 50 and/or a clamping mechanism 600.

As shown in FIG. 2, the first part 31 of the insulator 30 may define a bore, and the second part 33 may also define a bore. The first and second parts 31, 33, may each have an outer dimension. The outer dimension of the first part 31 may be larger than the outer dimension of the second part 33. The first and second parts 31, 33, may each have an inner dimension. The inner dimension of the first part 31 may be larger than the inner dimension of the second part 33. The bore defined by the second part 32 may be wider than the bore defined by the first part 31. The first and second parts 31, 33 may each comprise a wall, the wall defining the respective bore. The wall of the first part 31 may have a thickness substantially equal to the thickness of the wall of the second part 32. The connecting part 32 may have a wall surrounding a bore which connects the bore of the first part 31 to the bore of the second part 32. The wall of the second part 32 may have a thickness which is larger than the thickness of the first and/or second parts 31, 32.

The electrical insulator 30 may be disposed between and may be in contact with: an inner surface 27 of the outer sleeve 20 and an outer surface 17 of the inner rod 10. The electrical insulator 30 may be disposed between and in contact with: an inner surface 47 of a connecting sleeve 40, and an outer surface 67 of a clamping mechanism 600. The insulator 30 may be configured such that it has an outer dimension that is larger than an inner dimension of at least part of the connecting sleeve 40, as best seen in FIG. 3*b*. This has the advantage of providing a restriction to axial movement of the electrical insulator 30.

The ionisation and/or ignition device 1 may further comprise: a connecting sleeve 40; a connecting rod 50 and/or a clamping mechanism 600.

The connecting sleeve 40 may be connected to the root end 23 of the outer sleeve 20, the connecting sleeve 40 comprising an electrically conductive material. The connecting sleeve 40 may comprise a material having a lower hardness and/or a lower temperature resistance than the outer sleeve 20. When the device 1 is installed, the connecting sleeve 40 may not be exposed to as high temperatures as the outer sleeve 20, as it may be arranged further away from a heat source. The electrically conductive material of the connecting sleeve may comprise metal. The metal may comprise stainless steel. The connecting sleeve 40 may be provided as an extension of the electrically conductive path provided by the outer sleeve 20, while having a configuration suitable for its location relative to a heat source.

The connecting sleeve 40 may comprise a threaded portion 43, 44 which may be configured for attachment to the threaded portion 24 of the outer sleeve 20. The threaded portion may comprise two parts: a first threaded portion 43 on the connecting sleeve 40, and a second threaded portion 44 provided on a separate fixing component 440, shown in FIG. 4. The fixing component 440 may provide a secure threaded connection. The fixing component 440 having threaded portion 44 may comprise one or more outer flat portions 45, 46. The fixing component 440 may substantially take the form of an internally threaded ring like structure such as a nut. The outer flat portions may have the advantage of providing a grip which may allow the fixing component to lock the connecting sleeve 40 in place on the outer sleeve 20, and may further be utilised to prevent rotation or movement of the device 1 when installed. The fixing component can act as a lock nut to lock the connecting sleeve 40 in place relative to the outer sleeve 20.

The connecting rod 50 may be connected to a root end 13 of the inner rod 10. The connecting rod 50 may be provided as an extension of the electrically conductive path provided by the inner rod 10. As such, the connecting rod 50 may comprise an electrically conductive material. The connecting rod 50 may be configured to withstand temperatures of around 600 to 700° C. When the device 1 is installed, the connecting rod 50 may not be exposed to as high temperatures as the inner rod 10, as it may be arranged further away from a heat source. The connecting rod 50 may therefore comprise a material having a lower hardness and/or a lower temperature resistance than the inner rod 10. The electrically conductive material of the connecting rod 50 may comprise a metal. The metal may comprise stainless steel. The connecting rod 50 may comprise a threaded connection. A threaded nut 52 may be provided for threaded connection to the connecting rod 50.

The clamping mechanism 600 may be configured to fixedly attach the connecting rod 50 and the inner rod 10 to each other. The clamping mechanism 600 may achieve this by means of a clamping force.

The clamping mechanism 600 may be provided so as to fixedly attach the rod 10 to other components of the device 1. The clamping mechanism 600 may provide a connection between the rod 10, and one or more of the connecting rod 50, the electrical insulator 30, the outer sleeve 20 and the connecting sleeve 40. The clamping mechanism 600 may provide a means for fixedly attaching the inner rod 10 to the connecting rod 50. The clamping means 600 may comprise an electrically conductive material, and may be configured to provide an electrical connection between the inner rod 10 and the connecting rod 50.

Figure 5:
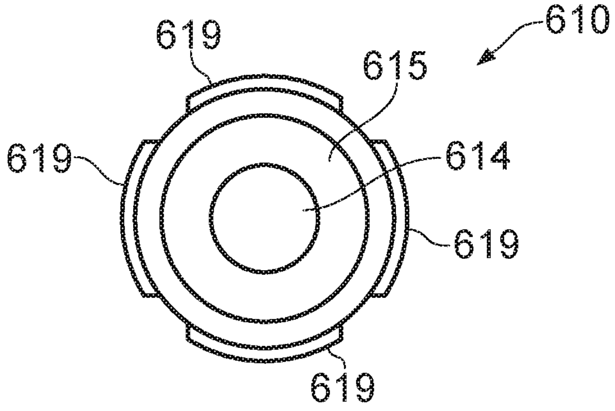
FIGS. 5*a*, 5*b* and 5*c* are front, cross-sectional, and rear views of an inner part of the clamping mechanism of the device of FIG. 1.
Figure 5:
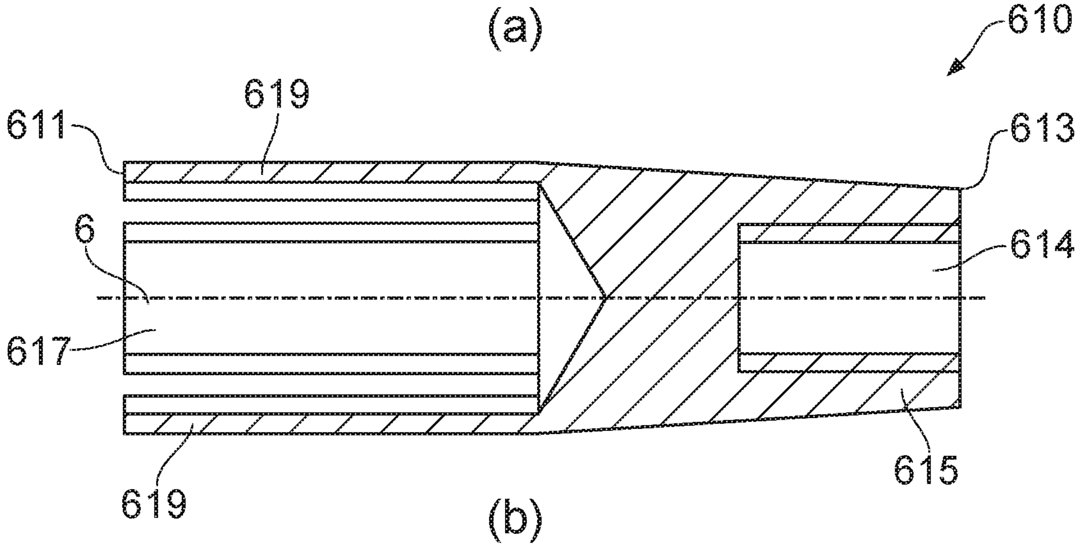
Figure 5:
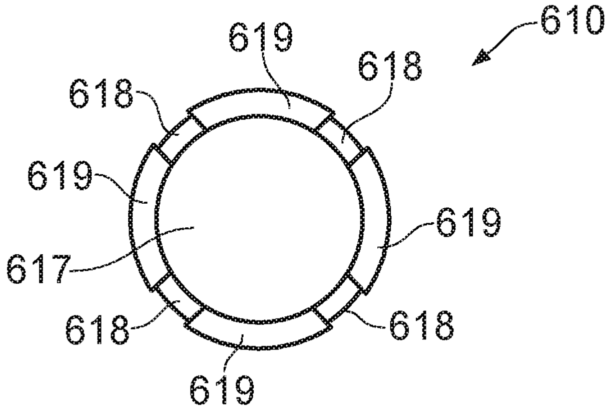
Figure 6:
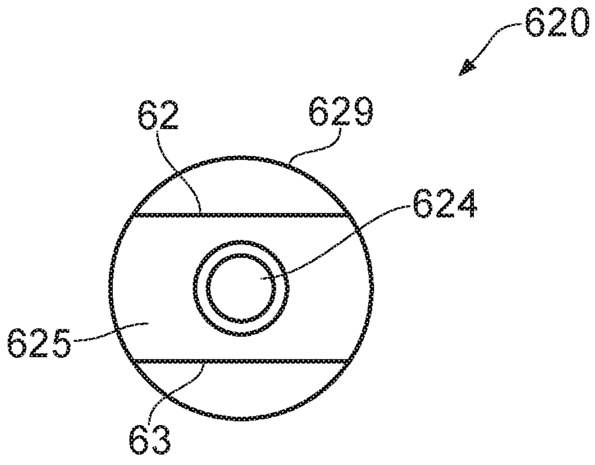
FIGS. 6*a* and 6*b* are front and cross-sectional views of an outer part of the clamping mechanism of the device of FIG. 1.
Figure 6:
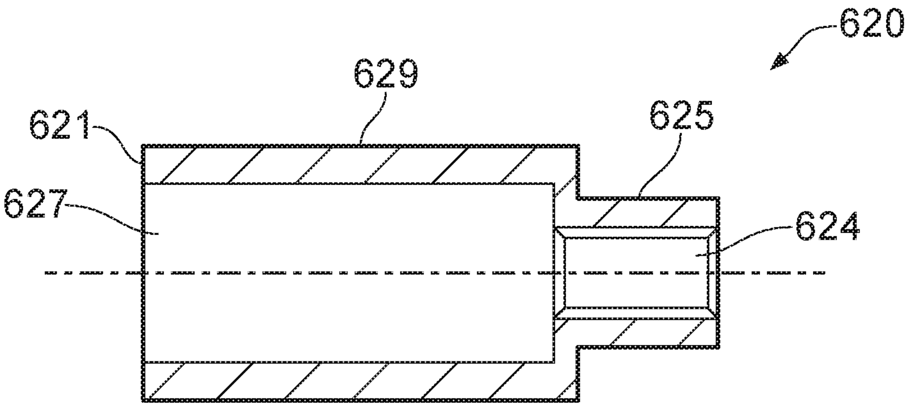

The clamping mechanism 600 may comprise a first opening 617, 627 configured to at least partially receive the inner rod 10, and a second opening 614, 625, configured to at least partially receive the connecting rod 50, as best seen in FIGS. 2, 5, and 6.

The clamping mechanism 600 may comprise first and second parts 610, 620, as shown in FIGS. 5 and 6 respectively. The first part 610 of the clamping mechanism 600 may be provided as an inner part 610. The second part 620 of the clamping mechanism 600 may be provided as an outer part 620. The inner part 610 may be configured to be received at least partially in the outer part 620, as shown in FIG. 2. The inner part 610 and the outer part 620 may each be configured for threaded attachment to the connecting rod 50.

The inner part 610 may be provided with one or more portions having a degree of flexibility to allow clamping onto the inner rod 10. Specifically, the inner part 610 may define a first opening 617 for receiving the rod 10, which may be configured to be deformable to grip the rod 10. The first opening 617 may be configured to be clamped by means of the outer part 620. Specifically, the first opening 617 may be clamped by movement of the inner part 610 into the outer part 620. The first opening 617 may be defined by at least one arm, the at least one arm being moveable so as to adjust, specifically to restrict or expand, the size of the opening. This has the advantage of providing a suitable degree of flexibility of the inner part 610. There may be provided two arms, moveable relative to each other, so as to vary the size of the first opening 617. As shown in FIG. 5*c*, there may be provided four arms 619, moveable towards and/or away from each other so as to vary the size of the opening 617. The inner part 610 may comprise any suitable number of arms, for example 1, 2, 3, 4, or 5 or more arms. Use of fewer arms may have the advantage of easier manufacture, and simpler construction. Use of more arms may have the advantage of ease of installation, and a more secure device in use. The arm or arms 619 may define an opening 617 at a first end 611 of the inner part 610. The opening 617 may be configured to at least partially receive the rod 10. The arm or arms 619 may be spaced apart from each other, such that there is a gap 618 between each arm 619, as best seen in FIG. 5*c*. This has the advantage of providing a flexibility of the inner part 610, such that the size of the opening 617 may be increased or reduced. This has the advantage of having an opening which can be restricted, or reduced in size, around the rod 10, so as to grip the rod 10. The arms 619 may be arranged such that they extend away from a central axis 6 of the inner part 610 in a direction from the second end 613 of the device to the first end 611. The inner part 610 may comprise a wall 615 which defines an opening 614 at a second end 613 of the inner part 610. The opening 614 may be configured to receive the connecting rod 50, and may be provide with a thread to engage a corresponding thread formed on the connecting rod 50.

As best seen in FIGS. 5*a* to 7, the outer part 620 may define a first opening 627, which may be configured to receive at least part of the inner part 610. The first opening 627 may be defined by a first wall 629 at a first end 621 of the outer part 620. The outer part 620 may define a second opening 624, configured to receive at least part of the connecting rod 50. The second opening 624 may be defined by a second wall 625. The first and second openings 627, 624, may be connected so as to provide a bore through the outer part 620. The second wall 625 may have a first flat portion 62 and a second flat portion 63. This has the advantage of providing a means for gripping the outer part 620 during installation, and allowing rotation of the device relative to connecting rod 50 in particular, to allow the outer part to be securely threaded onto the connecting rod 50. As will be appreciated from the drawings and the present description, the rod 11 can be clamped within an inner part 610 of the clamping means 600, by threading the outer part 620 onto the connecting rod 50 and by threading the inner part 610 onto the connecting rod within the outer part 620. This is described in further detail in the following sections.

The clamping mechanism 600 described herein has the advantage of being suitable for use with an inner rod 10 whose shape cannot be easily changed due to the material used for the rod 10 having a high hardness. The clamping mechanism 600 described herein, in combination with any of the variations and modifications described or shown herein, has the advantage of providing an attachment means which is suitable for use in a high temperature application in which there is limited space, and various limitations including a restriction on modifying the shape of the inner rod 10. The clamping mechanism(s) 600 described and shown herein have the advantage of being simple and structurally reliable in use.

The inventors have also devised a method of making an ionisation and/or ignition device 1 comprising one or more of the steps of: providing an outer sleeve 20 comprising a semiconductor refractory material; providing an inner rod 10 comprising a semiconductor refractory material which is harder than the outer sleeve material; providing an electrical insulator 30; inserting the inner rod 10 into the electrical insulator 30; inserting the electrical insulator 30 and the inner rod 10 into the outer sleeve 20. This method may be applicable to any embodiments of the device 1 described herein.

Figure 7:
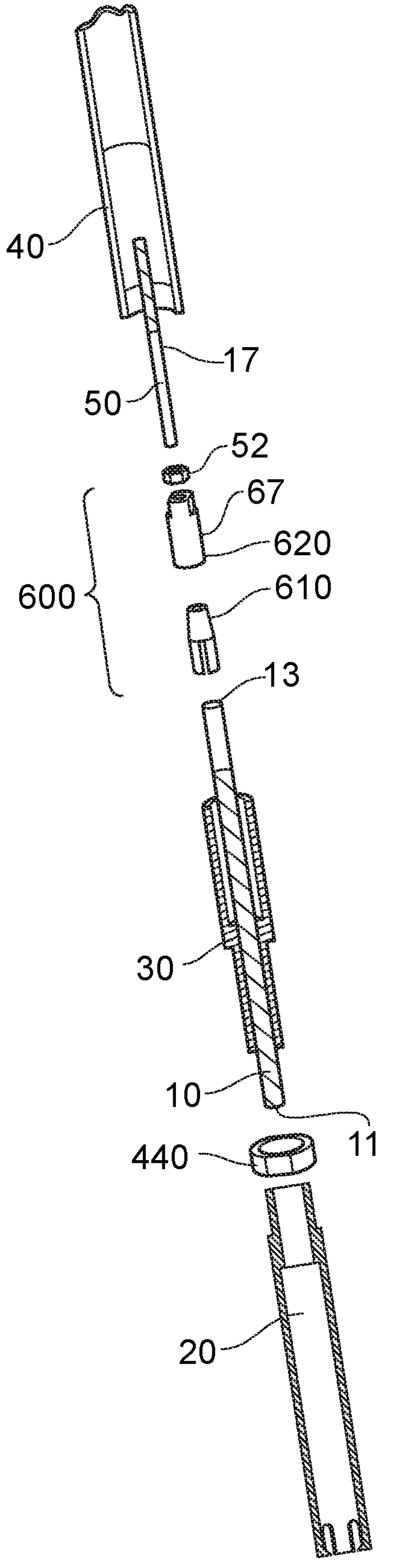
FIG. 7 is an expanded view of the device of FIG. 1.

The method of assembly may be best seen in relation to FIG. 7. The steps of: inserting the inner rod 10 into the electrical insulator 30; inserting the electrical insulator 30 and the inner rod 10 into the outer sleeve 20 may be performed in that order.

The method of assembly may further comprise on or more of the steps of: providing a connecting rod 50 and attaching the inner rod 10 to the connecting rod 50, which may be performed by means of a clamping mechanism 600. Clamping mechanism 600 may also be provided; along with inserting the inner rod 10, connecting rod 50 and clamping mechanism 600 into the electrical insulator 30; inserting the electrical insulator 30 and inner rod 10 into the outer sleeve 20; providing a fixing component 440; attaching the fixing component 440 to the outer sleeve 20; providing a connecting sleeve 40; attaching the connecting sleeve 40 to the outer sleeve 20 and locking the outer sleeve in place using the fixing component 440.

Attaching the inner rod 10 to the connecting rod 50 may be performed by means of a clamping force from a clamping mechanism 600. This attachment may include attaching the clamping mechanism 600 to an end of the connecting rod 50 and attaching the clamping mechanism 600 to a root end 13 of the inner rod 10. This may include one or more of: insertion of a root end 13 of the inner rod 10 into a first part 610 of the clamping mechanism; insertion of the an end of the connecting rod 50 into a second part 620 of the clamping mechanism 600; insertion of the first part 610 of the clamping mechanism 600 into the second part of the clamping mechanism 600.

Insertion of the root end 13 of the inner rod 10 into the first part 610 of the clamping mechanism 600 may involve insertion of the root end 13 of the inner rod 10 into a first opening 617 of the first part 610 of the clamping mechanism 600. Insertion of an end of the connecting rod 50 into a second part 620 of the clamping mechanism 600 may involve insertion of an end of the connecting rod 50 into a second opening 624 of the outer part 620 of the clamping mechanism 600. Insertion of an end of the connecting rod 50 into a second part 620 of the clamping mechanism 600 may involve insertion of a second end 613 of the first part 610 into a first opening 627 of the second part 620. This may include insertion of an end of the connecting rod 50 into a second opening 614 of the first part 610. Insertion of an end of the connecting rod 50 into a second opening 614 of the first part 610 may be performed simultaneously with insertion of the first part 610 into the second part 620. The method may also include movement of the second part 620 towards the first end 611 of the first part 610. This may cause arms 619 of the first part 610 to move together, to grip the inner rod 10. In practice, in the illustrated arrangement, the second part 620 may be threaded onto connecting rod 50. Then the first part 610 may be threaded onto the rod 50 at least partially inside the second part. Relative rotation of the first and second parts about the rod 50 can draw the first part into the second part and an tapered interface between the first and second parts can cause the second part to clamp the first part closed onto the inner rod 10. The arrangement can then be locked in place using the nut 52.

Insertion of one or more of the inner rod 10, connecting rod 50 and clamping mechanism 600 into the electrical insulator 30 may involve: insertion of at least part of the inner rod 10 into and through a first part 31 of the electrical insulator 30, and into and through a connecting part 32 of the electrical insulator 30, and at least partially into the second part 33 of the electrical insulator 30. Insertion of the connecting rod 50 and clamping mechanism 600 into the electrical insulator 30 may involve insertion of the connecting rod 50 and clamping mechanism 600 into a second part 33 of the electrical insulator 30.

Equally, all of the inner rod 10, connecting rod 50 and clamping mechanism 600 may be inserted into the electrical insulator 30 from a root end 38 of the electrical insulator 30.

Insertion of the electrical insulator 30 and inner rod 10 into the outer sleeve 20 may involve insertion of the electrical insulator 30 and inner rod 10 into a root end 23 of the outer sleeve 20. Insertion of the electrical insulator 30 and inner rod 10 into the outer sleeve 20 may be such that the electrical insulator 30 is disposed next to and in contact with an inner surface 27 of the outer sleeve 20.

Attachment of the fixing component 440 to the outer sleeve 20 may involve rotating the fixing component 440 and/or the outer sleeve 20 until the fixing component 440 is fixedly engaged with the outer sleeve 20.

Attachment of the connecting sleeve 40 to the outer sleeve 20 may involve rotating the connecting sleeve 40 and/or the outer sleeve 20 until the connecting sleeve 40 is threadedly engaged with the outer sleeve 20.

It should be noted that any suitable variation of the method described herein may be applicable to any variation of the ignition and/or ionisation device described herein. As a skilled person will appreciate, numerous variations of the above disclosure may be possible. Several variations have been described herein, however it should be noted that the disclosure herein is not an exclusive list of alternatives and embodiments.

The disclosure provided herein refers to an ignition and/or ionisation detection device. Each embodiment described herein may be suitable for each or either of these applications.

If the device 1 is used only as an ignition device, then the inner rod 10 and outer sleeve 20 may comprise stainless steel. If the device 1 is used only as an ignition device, then the inner rod 10 may be shorter than an inner rod 10 used for the device 1 if it were used for ionisation detection.

The invention claimed is:

1. A device configured for use as an ionisation detection device and/or as an ignition device, the device comprising:

an inner rod comprising a first semiconductor refractory material having a first hardness;

an outer sleeve comprising a second semiconductor refractory material having a second hardness;

a solid electrical insulator, the electrical insulator being disposed between the inner rod and the outer sleeve;

wherein the first hardness is greater than the second hardness.

2. The device according to claim 1, wherein at least one of the inner rod and the outer sleeve comprises a non-oxide ceramic.

3. The device according to claim 2, wherein the inner rod comprises silicon carbide and the outer sleeve comprises at least one of silicon carbide and a refractory metal.

4. The device according to claim 3, wherein at least a portion of the silicon carbide of the inner rod is re-crystallised silicon carbide, and wherein at least a portion of the silicon carbide of the outer sleeve is sintered silicon carbide.

5. The device according to claim 3, wherein at least a portion of the silicon carbide of the inner rod is re-crystallised silicon carbide, and wherein at least a portion of the silicon carbide of the outer sleeve is silicon-infiltrated silicon carbide.

6. The device according to claim 1, wherein the outer sleeve a tip end, a root end distal from the tip end, and a connector portion disposed adjacent to the root end for connection to a connecting sleeve.

7. The device according claim 6, wherein the outer sleeve a microstructure indicative of a component which has been machined and subsequently sintered.

8. The device according to claim 6, wherein the outer sleeve a body portion, and a greatest radial or diametric dimension of the connector portion is smaller than a greatest external radial or diametric dimension of the body portion.

9. The device according to claim 6, wherein the tip end of the outer sleeve one or more projecting tip(s), the projecting tip(s) being configured to extend towards the inner rod to define an air gap between the projecting tip(s) and the inner rod.

10. The device according to claim 9, wherein the projecting tip has a tapered end tapering toward the air gap.

11. The device according to claim 6, further comprising the connecting sleeve connected to the root end of the outer sleeve, the connecting sleeve comprising an electrically conductive material.

12. The device according to claim 11, wherein the connecting sleeve a material having at least one of a lower hardness and a lower temperature resistance than the outer sleeve.

13. The device according to claim 6, wherein the inner rod has a root end, and wherein the ionisation and/or ignition device further comprises a connecting rod, connected to the root end of the inner rod, the connecting rod comprising an electrically conductive material.

14. The device according to claim 13, wherein the connecting rod a material having at least one of a lower hardness and a lower temperature resistance than the inner rod.

15. The device according to claim 13, further comprising connection means, the connection means being configured to fixedly attach the connecting rod and the inner rod to one another via an outer surface of the inner rod.

16. The device according to claim 15, wherein the electrical insulator is disposed between and is in contact with: an inner surface of the outer sleeve and an outer surface of the inner rod; and wherein the electrical insulator is disposed between and is in contact with: an inner surface of the connecting sleeve, and an outer surface of the connection means.

17. A method of making an ionisation detection and/or ignition device comprising the steps of:
- providing an outer sleeve comprising a first semiconductor refractory material;
- providing, within the outer sleeve, an inner rod comprising a second semiconductor refractory material which is harder than the first semiconductor refractory material;
- providing a solid electrical insulator between the inner rod and the outer sleeve.

18. The device according to claim 1, further comprising:
- a connecting sleeve comprising a first electrically conductive material; and
- a connecting rod comprising a second electrically conductive material;

wherein:
- the outer sleeve a tip end and a root end distal from the tip end, and the root end is connected to the connecting sleeve;
- the inner rod has a root end, and the connecting rod is connected to the root end of the inner rod; and
- wherein the electrical insulator is disposed between and is in contact with: an inner surface of the outer sleeve and an outer surface of the inner rod.

19. The device according to claim 18, wherein the tip end of the outer sleeve one or more projecting tip(s), the projecting tip(s) being configured to extend towards the inner rod to define an air gap between the projecting tip(s) and the inner rod, and wherein the projecting tip(s) has a tapered end tapering toward the air gap.

20. The device according to claim 19, wherein:
- the connecting sleeve stainless steel having a lower hardness and a lower temperature resistance than the outer sleeve;
- the connecting rod stainless steel having a lower hardness and a lower temperature resistance than the inner rod;
- the inner rod silicon carbide; and
- the outer sleeve at least one of silicon carbide and a refractory metal.

21. A device configured for use as an ionisation detection device and/or as an ignition device, the device comprising:
- an inner rod comprising re-crystallised silicon carbide having a first hardness;
- an outer sleeve comprising sintered silicon carbide having a second hardness;
- an electrical insulator, the electrical insulator being disposed between the inner rod and the outer sleeve;
- wherein the first hardness is greater than the second hardness.

* * * * *